United States Patent
Ono et al.

(10) Patent No.: US 12,351,716 B2
(45) Date of Patent: Jul. 8, 2025

(54) METHOD FOR RECYCLING NITRILE RUBBER

(71) Applicant: ZEON CORPORATION, Tokyo (JP)

(72) Inventors: Kentaro Ono, Tokyo (JP); Sayaka Inoue, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 901 days.

(21) Appl. No.: 17/418,989

(22) PCT Filed: Dec. 25, 2019

(86) PCT No.: PCT/JP2019/050856
§ 371 (c)(1),
(2) Date: Jun. 28, 2021

(87) PCT Pub. No.: WO2020/138183
PCT Pub. Date: Jul. 2, 2020

(65) Prior Publication Data
US 2022/0106464 A1    Apr. 7, 2022

(30) Foreign Application Priority Data

Dec. 28, 2018   (JP) ................................ 2018-248404

(51) Int. Cl.
| | |
|---|---|
| *C08L 9/04* | (2006.01) |
| *B29B 17/02* | (2006.01) |
| *C08J 3/16* | (2006.01) |
| *C08J 11/06* | (2006.01) |

(52) U.S. Cl.
CPC ................ *C08L 9/04* (2013.01); *B29B 17/02* (2013.01); *C08J 3/16* (2013.01); *C08J 11/06* (2013.01); *B29B 2017/0217* (2013.01); *B29B 2017/0289* (2013.01); *C08J 2309/04* (2013.01); *C08L 2207/24* (2013.01)

(58) Field of Classification Search
CPC ..... C08L 9/04; C08J 11/06; C08J 3/16; B29B 17/02
See application file for complete search history.

(56) References Cited

U.S. PATENT DOCUMENTS

2014/0065336 A1*  3/2014  Nakashima ............. C08L 33/20
                                                                  525/183

FOREIGN PATENT DOCUMENTS

| JP | H10-100145 A | 4/1998 |
| JP | 2004-131654 A | 4/2004 |
| JP | 2009-179686 A | 8/2009 |
| JP | 2011-012142 A | 1/2011 |

OTHER PUBLICATIONS https://elitepumps.net/, published online Apr. 24, 2024.*
Jun. 16, 2021 International Preliminary Report on Patentability issued in International Patent Application No. PCT/JP2019/050856.
Mar. 24, 2020 International Search Report issued in International Patent Application No. PCT/JP2019/050856.
Jul. 28, 2022 Search Report in European Application No. 19902989.3.

* cited by examiner

*Primary Examiner* — Gregory Listvoyb
(74) *Attorney, Agent, or Firm* — Oliff PLC

(57) ABSTRACT

A method of recovering nitrile rubber from water-containing crumbs includes crumb-like nitrile rubber using an extruder in which a screw is disposed inside a barrel so as to be capable of being rotationally driven. The barrel is formed with at least a washing zone. The method includes supplying washing water to the washing zone at a water pressure of 0.2 MPa or higher while mixing the crumb-like nitrile rubber and the supplied washing water in the washing zone, thereby washing the crumb-like nitrile rubber.

15 Claims, 6 Drawing Sheets

METHOD FOR RECYCLING NITRILE RUBBER

TECHNICAL FIELD

The present invention relates to a method of recovering nitrile rubber from water-containing crumbs comprising crumb-like nitrile rubber.

BACKGROUND ART

In general, recovery of a polymer from polymer latex obtained by emulsion polymerization is performed through first adding a coagulant such as an aqueous solution of acid or inorganic salt, for example, to the polymer latex in a coagulation tank to coagulate the latex while stirring them, then introducing polymer crumbs obtained by the coagulation operation to a dewatering apparatus such as a centrifugal dehydrator or a squeezer, for example, to dewater the polymer crumbs, and thereafter introducing the dewatered polymer crumbs to a drying apparatus such as a band dryer, an air flow dryer, or an extrusion dryer, for example, to dry the polymer. A pelletizer or a baler machine is usually connected to the downstream side of the drying apparatus, and the dried polymer is often finally processed into a pellet-like, bale-like, or sheet-like shape to be commercialized.

However, if these dewatering/drying apparatuses are used to recover the polymer from the polymer latex, not only the number of steps increases, but also the apparatus cost of the coagulation tank and incidental facilities becomes high, and the installation space increases, thus leading to many problems.

To solve such problems, in Patent Document 1, for example, a method is attempted to supply polymer latex and a coagulant directly to the inside of a screw extruder and perform coagulation/dewatering/drying inside the extruder. In the method described in Patent Document 1, however, a relatively large amount of the coagulant remains in the obtained polymer, and the challenge is therefore that the characteristic deterioration (such as deterioration of water resistance, for example) occurs due to the remaining coagulant.

RELATED ART DOCUMENTS

Patent Documents

Patent Document 1: JP2011-12142A

SUMMARY OF INVENTION

Problem to be Solved by the Invention

The present invention has been made in consideration of such circumstances, and an object of the present invention is to provide a method of recovering nitrile rubber with which when the nitrile rubber is recovered from water-containing crumbs comprising crumb-like nitrile rubber, the amount of a coagulant used for coagulation can be effectively reduced.

Means for Solving the Problem

As a result of extensive studies to achieve the above object, the present inventors have found that the amount of a coagulant used for coagulation can be effectively reduced through, when recovering nitrile rubber from water-containing crumbs comprising crumb-like nitrile rubber using an extruder in which a screw is disposed so as to be capable of being rotationally driven inside a barrel that is formed with at least a washing/dewatering zone, supplying washing water to the washing/dewatering zone at a water pressure of 0.2 MPa or higher while mixing the crumb-like nitrile rubber and the supplied washing water in the washing/dewater zone, thereby washing and dewatering the crumb-like nitrile rubber. Thus, the present inventors have completed the present invention.

That is, the present invention provides a method of recovering nitrile rubber from water-containing crumbs comprising crumb-like nitrile rubber using an extruder in which a screw is disposed inside a barrel so as to be capable of being rotationally driven. The barrel is formed with at least a washing/dewatering zone. The method comprises supplying washing water to the washing/dewatering zone at a water pressure of 0.2 MPa or higher while mixing the crumb-like nitrile rubber and the supplied washing water in the washing/dewater zone, thereby washing and dewatering the crumb-like nitrile rubber.

In the method of recovering nitrile rubber according to the present invention, the screw for use preferably comprises a kneading disk provided at a site corresponding to a supply position for the washing water.

In the method of recovering nitrile rubber according to the present invention, the extruder for use preferably has a plurality of barrel blocks, and a screw configuration of the screw in a barrel block formed with a supply port for supplying the washing water is preferably such that a fraction occupied by the kneading disk in a longitudinal direction is within a range from 5% to 100%.

In the method of recovering nitrile rubber according to the present invention, the extruder for use preferably comprises a coagulation zone provided on an upstream side of the washing/dewatering zone, latex of nitrile rubber and coagulation water are preferably supplied to the coagulation zone to coagulate the latex of nitrile rubber thereby to obtain the water-containing crumbs comprising the crumb-like nitrile rubber, and washing and dewatering are preferably then performed in the washing/dewatering zone.

In the method of recovering nitrile rubber according to the present invention, a supply rate of the latex of nitrile rubber to the extruder is preferably from 50 to 2000 kg/hr.

In the method of recovering nitrile rubber according to the present invention, the extruder for use preferably comprises a drying zone provided on a downstream side of the washing/dewatering zone, and the crumb-like nitrile rubber after performing washing and dewatering in the washing/dewatering zone is preferably dried in the drying zone.

In the method of recovering nitrile rubber according to the present invention, a supply rate of the washing water to the washing/dewatering zone is preferably from 10 to 400 L/hr.

In the method of recovering nitrile rubber according to the present invention, a supply amount of the washing water to the washing/dewatering zone is preferably from 25 to 1000 parts by weight with respect to 100 parts by weight of the nitrile rubber.

In the method of recovering nitrile rubber according to the present invention, a temperature of the washing water is preferably from 20° C. to 95° C.

Effects of Invention

According to the present invention, when the nitrile rubber is recovered from the water-containing crumbs comprising the crumb-like nitrile rubber, the amount of a coagulant used for coagulation can be effectively reduced.

DESCRIPTION OF EMBODIMENTS

Figure 1:
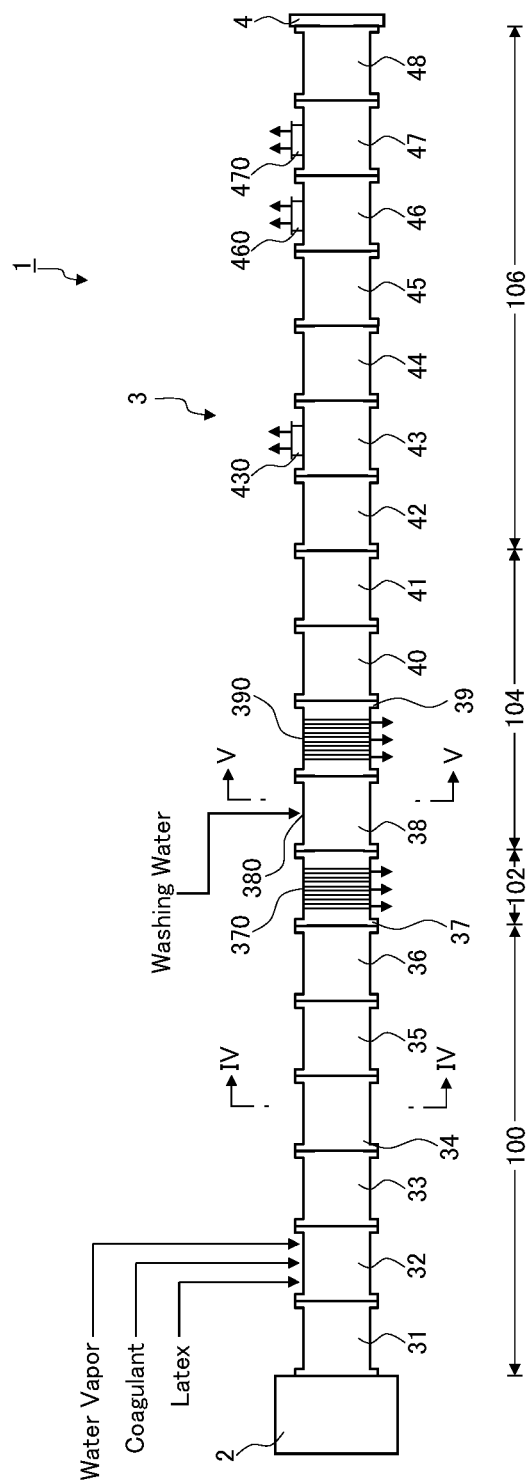
FIG. 1 is a schematic view illustrating an extruder used in the method of recovering nitrile rubber according to a first embodiment of the present invention.

The present invention provides a method of recovering nitrile rubber from water-containing crumbs comprising crumb-like nitrile rubber using an extruder in which a screw is disposed inside a barrel so as to be capable of being rotationally driven. The barrel is famed with at least a washing/dewatering zone. The method comprises supplying washing water to the washing/dewatering zone at a water pressure of 0.2 MPa or higher while mixing the crumb-like nitrile rubber and the supplied washing water in the washing/dewater zone, thereby washing and dewatering the crumb-like nitrile rubber.
Nitrile Rubber>

First, the nitrile rubber used in the present invention will be described.

The nitrile rubber used in the present invention is not particularly limited. Examples of the nitrile rubber include a copolymer obtained by copolymerizing an α,β-ethylenically unsaturated nitrile monomer, a conjugated diene monomer, and one or more other monomers that are copolymerizable with the above monomers and used as necessary.

The α,β-ethylenically unsaturated nitrile monomer is not limited so long as it is an α,β-ethylenically unsaturated compound having a nitrile group. Examples of the α,β-ethylenically unsaturated nitrile monomer include acrylonitrile; α-halogenoacrylonitriles such as α-chloroacrylonitrile and α-bromoacrylonitrile; α-alkylacrylonitriles such as methacrylonitrile; and the like, among which acrylonitrile and methacrylonitrile are preferred. One type of the α,β-ethylenically unsaturated nitrile monomer may be used alone, or two or more types may also be used in combination.

In the nitrile rubber used in the present invention, the content ratio of the α,β-ethylenically unsaturated nitrile monomer units is preferably from 5 to 60 wt %, more preferably from 8 to 55 wt %, and further preferably from 10 to 50 wt %. When the content ratio of the α,β-ethylenically unsaturated nitrile monomer unit falls within the above range, the oil resistance and the cold resistance can be well balanced in the obtained cross-linked rubber.

As the conjugated diene monomer, conjugated diene monomers having 4 to 6 carbon atoms, such as 1,3-butadiene, isoprene, 2,3-dimethyl-1,3-butadiene, 1,3-pentadiene, and chloroprene, are preferred, 1,3-butadiene and isoprene are more preferred, and 1,3-butadiene is particularly preferred. Among these, 1,3-butadiene is preferred. These may each be used alone, or two or more types may also be used in combination.

In the nitrile rubber used in the present invention, the content ratio of the conjugated diene monomer units (including saturated units) is preferably from 10 to 95 wt %, more preferably from 15 to 90 wt %, and further preferably from 20 to 85 wt %. When the content ratio of the conjugated diene monomer units falls within the above range, the rubber elasticity of the obtained cross-linked rubber can be appropriately enhanced while improving the oil resistance, heat aging resistance, and chemical resistance stability.

The nitrile rubber used in the present invention is preferably a copolymer obtained by copolymerizing a carboxyl group-containing monomer in addition to the α,β-ethylenically unsaturated nitrile monomer and the conjugated diene monomer. When the carboxyl group-containing monomer is additionally copolymerized, the compression set resistance of the obtained cross-linked rubber can be enhanced.

The carboxyl group-containing monomer is not particularly limited so long as it is a monomer copolymerizable with an α,β-ethylenically unsaturated nitrile monomer and having one or more unsubstituted (free) carboxyl groups that are not subjected to esterification or the like.

Examples of the carboxyl group-containing monomers include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomers also include those having carboxyl groups that form carboxylates. In addition, anhydrides of the α,β-ethylenically unsaturated polyvalent carboxylic acids can be used as the carboxyl group-containing monomers because their acid anhydride groups are cleaved to form carboxyl groups after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of the anhydrides of the α,β-ethylenically unsaturated polyvalent carboxylic acids include maleic anhydride, itaconic anhydride, citraconic anhydride, and the like.

Examples of the α,β-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

One type of the carboxyl group-containing monomer may be used alone, or two or more types may also be used in combination. Among these, the α,β-ethylenically unsaturated dicarboxylic acid monoester monomers are preferred, the α,β-ethylenically unsaturated dicarboxylic acid monoalkyl ester monomers are more preferred, maleic acid monoalkyl ester is further preferred, and mono-n-butyl maleate is particularly preferred. Note that the above alkyl esters preferably have 2 to 8 carbon atoms.

In the nitrile rubber used in the present invention, the content of the carboxyl group-containing monomer unit is preferably from 0.1 to 20 wt %, more preferably from 0.5 to 15 wt %, and further preferably from 1 to 10 wt %. When the content of the carboxyl group-containing monomer unit falls within the above range, the mechanical properties and the compression set resistance of the obtained cross-linked rubber can be further improved.

From the viewpoint of further enhancing the cold resistance, the nitrile rubber used in the present invention is preferably a copolymer obtained by copolymerizing an α,β-ethylenically unsaturated monocarboxylic acid ester monomer in addition to the α,β-ethylenically unsaturated nitrile monomer, the conjugated diene monomer, and the carboxyl group-containing monomer.

The α,β-ethylenically unsaturated monocarboxylic acid ester monomer is not particularly limited. Examples of the α,β-ethylenically unsaturated monocarboxylic acid ester monomer include α,β-ethylenically unsaturated monocarboxylic acid alkyl ester monomers, α,β-ethylenically unsaturated monocarboxylic acid alkoxyalkyl ester monomers, ethylenically unsaturated monocarboxylic acid aminoalkyl ester monomers, α,β-ethylenically unsaturated monocarboxylic acid hydroxyalkyl ester monomers, α,β-ethylenically unsaturated monocarboxylic acid fluoroalkyl ester monomers, and the like. Among these, α,β-ethylenically unsaturated monocarboxylic acid alkyl ester monomers or α,β-ethylenically unsaturated monocarboxylic acid alkoxyalkyl ester monomers are preferred.

The α,β-ethylenically unsaturated monocarboxylic acid alkyl ester monomer preferably has an alkyl group having 3 to 10 carbon atoms, more preferably has an alkyl group having 3 to 8 carbon atoms, and further preferably has an alkyl group having 4 to 6 carbon atoms, as the alkyl group.

Specific examples of the α,β-ethylenically unsaturated monocarboxylic acid alkyl ester monomer include acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkylcycloalkyl ester monomers such as methylcyclopentyl acrylate, ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate and methylcyclohexyl crotonate; and the like.

The α,β-ethylenically unsaturated monocarboxylic acid alkoxyalkyl ester monomer preferably has an alkoxyalkyl group having 2 to 8 carbon atoms, more preferably has an alkoxyalkyl group having 2 to 6 carbon atoms, and further preferably has an alkoxyalkyl group having 2 to 4 carbon atoms, as the alkoxy alkyl group.

Specific examples of the α,β-ethylenically unsaturated monocarboxylic acid alkoxyalkyl ester monomer include acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; and the like.

Among these α,β-ethylenically unsaturated monocarboxylic acid ester monomers, the acrylic acid alkyl ester monomer and the acrylic acid alkoxyalkyl ester monomer are preferred, and the n-butyl acrylate and the methoxyethyl acrylate are more preferred. Two or more types of these α,β-ethylenically unsaturated monocarboxylic acid ester monomers can also be used in combination.

One type of the α,β-ethylenically unsaturated monocarboxylic acid ester monomer may be used alone, or two or more types may also be used in combination. In the nitrile rubber used in the present invention, the content of the α,β-ethylenically unsaturated monocarboxylic acid ester monomer unit is preferably from 10 to 60 wt %, more preferably from 15 to 55 wt %, and further preferably from 20 to 50 wt %. When the content of the α,β-ethylenically unsaturated monocarboxylic acid ester monomer unit falls within the above range, the cold resistance of the obtained cross-linked rubber can be further appropriately enhanced.

The nitrile rubber used in the present invention may be a copolymer obtained by copolymerizing, in addition to the α,β-ethylenically unsaturated nitrile monomer, the conjugated diene monomer, the carboxyl group-containing monomer, and the α,β-ethylenically unsaturated monocarboxylic acid ester monomer, one or more other monomers that are copolymerizable with the above monomers. Examples of such other monomers include an α,β-ethylenically unsaturated monocarboxylic acid ester monomer (excluding those described above), ethylene, an α-olefin monomer, an aromatic vinyl monomer, a fluorine-containing vinyl monomer, a copolymerizable antiaging agent, and the like.

Examples of such an α,β-ethylenically unsaturated monocarboxylic acid ester monomer include (meth)acrylic acid esters each having a cyanoalkyl group having 2 to 12 carbon atoms, such as α-cyanoethyl acrylate, α-cyanoethyl methacrylate, and cyanobutyl methacrylate; (meth)acrylic acid esters each having a hydroxyalkyl group having 1 to 12 carbon atoms, such as 2-hydroxyethyl acrylate, 2-hydroxypropyl acrylate, and 2-hydroxyethyl methacrylate; (meth) acrylic acid esters each having a fluoroalkyl group having 1 to 12 carbon atoms, such as trifluoroethyl acrylate and tetrafluoropropyl methacrylate; and the like.

The α-olefin monomer preferably has 3 to 12 carbon atoms, and examples of such an α-olefin monomer include propylene, 1-butene, 4-methyl-1-pentene, 1-hexane, 1-octane, and the like.

Examples of the aromatic vinyl monomer include styrene, α-methylstyrene, vinylpyridine, and the like.

Examples of the fluorine-containing vinyl monomer include fluoroethyl vinyl ether, fluoropropyl vinyl ether, o-tri fluoromethylstyrene, vinyl pentafluorobenzoate, difluoroethylene, tetrafluoroethylene, and the like.

Examples of the copolymerizable antiaging agent include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, and the like.

These copolymerizable other monomers may each be used alone, or two or more types may also be used in combination. The content of the other monomer units in the nitrile rubber used in the present invention is preferably 30 wt % or less, more preferably 15 wt % or less, and further preferably 5 wt % or less.

The Mooney viscosity [ML1+4 (100° C.)] of the nitrile rubber used in the present invention is preferably from 5 to 200, more preferably from 10 to 100, and further preferably from 15 to 80. The Mooney viscosity of the nitrile rubber can be adjusted by appropriately selecting conditions such as the amount of a chain transfer agent, the polymerization reaction temperature, and the concentration of a polymerization initiator.

The method of producing the nitrile rubber used in the present invention is not particularly limited, and a convenient and preferred method includes, for example, copolymerizing an α,β-ethylenically unsaturated nitrile monomer and a conjugated diene monomer, and a carboxyl group-containing monomer, an α,β-ethylenically unsaturated monocarboxylic acid ester monomer, and one or more other monomers that are copolymerizable with the above monomers, which are added as necessary. Any of known emulsion polymerization method and solution polymerization method can be used as the polymerization method, but the emulsion polymerization method is preferred because the control of the polymerization reaction is easy. According to the emulsion polymerization method, the nitrile rubber can be obtained in a form of latex in which the nitrile rubber is dispersed in an aqueous medium, that is, as the latex of the nitrile rubber.

The nitrile rubber used in the present invention may also be one in which at least a part of the carbon-carbon double bonds in the polymer main chain is hydrogenated. When the nitrile rubber is obtained in a form of latex in which the nitrile rubber is dispersed in an aqueous medium, the hydrogenation reaction is preferably performed in a state of latex of the nitrile rubber, and the type and amount of a hydrogenation catalyst used for the hydrogenation reaction, the hydrogenation temperature, and the like may be determined in accordance with a known method. When hydrogenating the nitrile rubber, the hydrogenation may be performed so that the iodine value of the obtained hydrogenated nitrile rubber is preferably 120 or less, more preferably 100 or less, and further preferably 80 or less.

When a hydrogenation catalyst or the like that contains a platinum group element is used in the hydrogenation reaction, an operation of removing the hydrogenation catalyst may be performed. The removal of the hydrogenation catalyst is performed, for example, by the following method. First, an insoluble complex is formed and precipitated using a complexing agent to complex the platinum group element in a platinum group element compound that is present in the aqueous medium or the polymer particles of the latex of nitrile rubber after the hydrogenation reaction. Then, the latex containing the insoluble complex thus obtained is continuously supplied to a centrifugal separator to continuously perform a centrifugal separation operation, and the platinum group element can thereby be continuously removed in a state of the insoluble complex from the latex of nitrile rubber. In this operation, another separation method may be adopted as substitute for the centrifugal separation operation.

<Method of Recovering Nitrile Rubber According to First Embodiment>

The method of recovering nitrile rubber according to the first embodiment of the present invention will then be described.

FIG. 1 is a schematic view illustrating an extruder 1 used in the method of recovering nitrile rubber according to the first embodiment of the present invention.

The following description will be made for an exemplary case in which the method of recovering nitrile rubber is performed using the extruder 1 illustrated in FIG. 1 as a nitrile rubber recovery apparatus used in the present invention. This method includes obtaining the water-containing crumbs comprising the crumb-like nitrile rubber from the latex of nitrile rubber obtained in accordance with the above method and then recovering the nitrile rubber from the water-containing crumbs.

As illustrated in FIG. 1, the extruder 1 as a nitrile rubber recovery apparatus according to the first embodiment has a drive unit 2 and a single barrel 3 that is composed of 18 divided barrel blocks 31 to 48. In the barrel 3, a coagulation zone 100, a drainage zone 102, a washing/dewatering zone 104, and a drying zone 106 are famed in this order from the upstream side to the downstream side of the barrel 3.

The coagulation zone 100 is a region in which the latex of nitrile rubber and a coagulant are brought into contact with each other to coagulate the polymer to form a slurry liquid of crumb-like nitrile rubber (crumb slurry). The drainage zone 102 is a region in which a liquid (serum water) caused after the coagulation of the nitrile rubber is separated from the crumb slurry and discharged to form crumbs in a water-containing state. The washing/dewatering zone 104 is a region in which the crumbs in the water-containing state are washed and the washing water is removed from the washed crumbs and discharged. The drying zone 106 is a region in which the dewatered crumbs are dried.

In the first embodiment, the inside of the barrel blocks 31 to 36 corresponds to the coagulation zone 100, the inside of the barrel block 37 corresponds to the drainage zone 102, the inside of the barrel blocks 38 to 41 corresponds to the washing/dewatering zone 104, and the inside of the barrel blocks 42 to 48 corresponds to the drying zone 106. The number of barrel blocks to be installed can be optimized for implementation in accordance with the composition of the nitrile rubber to be handled, etc., and is not limited to that illustrated in FIG. 1.

The barrel block 32 which constitutes a part of the coagulation zone 100 is formed with a feed port 320 (not illustrated) for supplying the latex of nitrile rubber, a feed port 321 (not illustrated) for supplying a coagulant, and a feed port 322 (not illustrated) for supplying water vapor. The barrel block 37 which constitutes the drainage zone 102 is famed with drainage slits 370 that discharge the serum water separated from the water slurry of coagulated nitrile rubber. The barrel block 38 which constitutes a part of the washing/dewatering zone 104 is foiled with a first washing water feed port 380 that receives the washing water, and the barrel block 39 is famed with drainage slits that discharge the washing drainage to the outside. The barrel blocks 43, 46, and 47 which constitute a part of the drying zone 106 are formed with vent ports 430, 460, and 470 for degassing, respectively.

Figure 2:
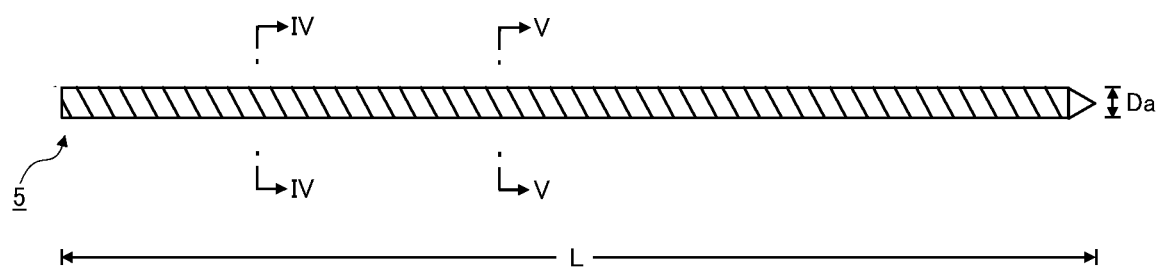
FIG. 2 is a schematic view illustrating a screw disposed inside the extruder.

FIG. 2 is a schematic view illustrating a screw disposed inside the extruder 1. A screw 5 as illustrated in FIG. 2 is disposed inside the barrel 3. To drive the screw 5, a drive means such as a motor housed in the drive unit 2 (see FIG. 1) is connected to the base end of the screw 5, and the screw 5 is thereby held so as to be capable of being rotationally driven. The shape of the screw 5 is not particularly limited, but the screw 5 can be configured, for example, such that screw blocks and kneading disks having various screw configurations are appropriately combined.

Figure 3:
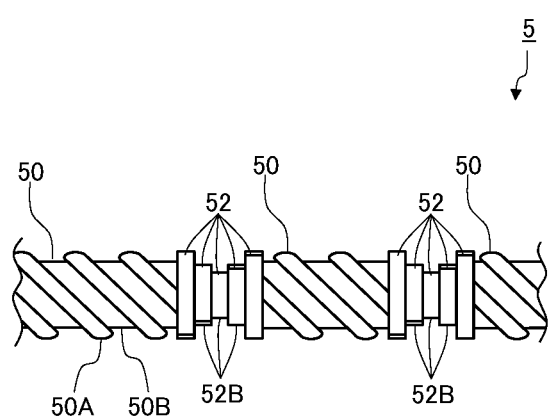
FIG. 3 is a partially broken schematic view of the screw of FIG. 2.

In the first embodiment, the screw 5 has a screw configuration of a different form in the region corresponding to each of the above-described zones 100, 102, 104, and 106 famed inside the barrel 3. Here, FIG. 3 is a partially broken schematic view of the screw of FIG. 2. As illustrated in FIG. 3, the screw 5 is composed of screw blocks 50 and kneading disks 52. FIG. 3 is a diagram illustrating an example of a combination of the screw blocks 50 and the kneading disks 52, and the first embodiment is not particularly limited to the combination illustrated in FIG. 3.

As illustrated in FIG. 2, in the first embodiment, when the length of the screw 5 is L (mm) and the outer diameter of the screw 5 is Da (mm), L/Da is preferably from 30 to 100 and more preferably from 40 to 80. The outer diameter Da of the screws 5 is defined as the diameter of crest portions 50A (see FIG. 3) of the screw blocks 50, which constitute the screw, when viewed from the axial direction.

Figure 4:
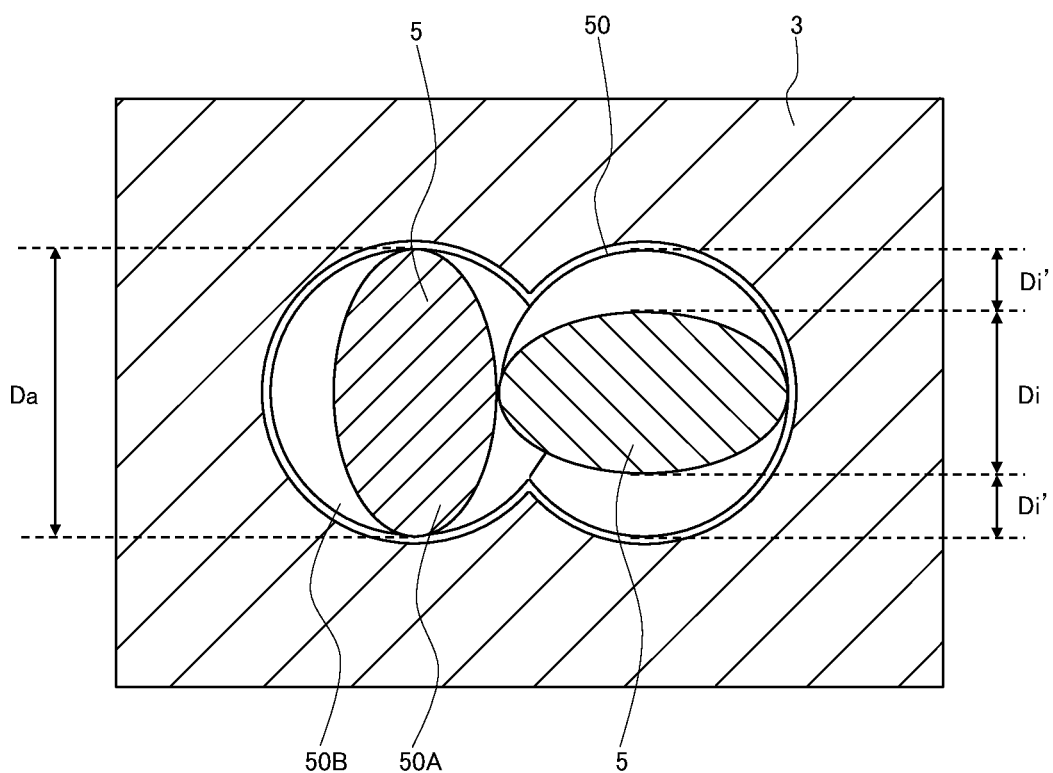
FIG. 4 is a cross-sectional view taken along IV-IV line of FIG. 1 and IV-IV line of FIG. 2.

As illustrated in FIG. 4, in the first embodiment, two such screws 5 are used to provide a twin-screw extruder in which the shaft cores are meshed with each other in parallel. Here, FIG. 4 is a cross-sectional view taken along IV-IV line of FIG. 1 and IV-IV line of FIG. 2, and the cross-sectional view illustrated in FIG. 4 is a cross-sectional view of a screw block 50 portion of the extruder 1. This cross-sectional view crosses root portions 50B. That is, as illustrated in FIG. 4, the two screws 5 and 5 are of a biaxial meshing type in which the crest portion 50A of a screw block 50 for coagulation of one screw 5 is meshed with the root portion 50B of a screw block 50 for coagulation of the other screw 5 while the root portion 50B of the screw block 50 for coagulation of the one screw 5 is meshed with the crest portion 50A of the screw block 50 for coagulation of the other screw 5. The biaxial meshing type can improve the mixing property in each of the zones 100, 102, 104, and 106. The rotation directions of the two screws 5 may be the same direction or different directions, but from the viewpoint of self-cleaning performance, the type of rotation in the same direction is preferred.

As illustrated in FIG. 4, in the first embodiment, when the outer diameter of the screw block 50 is Da (mm) and the shorter diameter of the root portion 50B of the screw block 50 is Di (mm), Da/Di is preferably in a range from 1.2 to 2.5, more preferably a range from 1.4 to 2.0, and further preferably a range from 1.5 to 1.8. By setting Da/Di in such a range, the recovery rate and the production rate (amount of dried nitrile rubber obtained per unit time) can be improved without making the facilities large-scale.

As illustrated in FIG. 4, the shorter diameter Di of the root portion 50B is the diameter of a portion of the root portion 50B in which the depth of the root portion 50B is a deepest depth Dl' (mm) when viewed from the axial direction. That is, the shorter diameter Di of the root portion 50B can be obtained as Di=Da−Di'×2 from the outer diameter Da and the deepest depth Di' of the root portion 50B.

Figure 5:
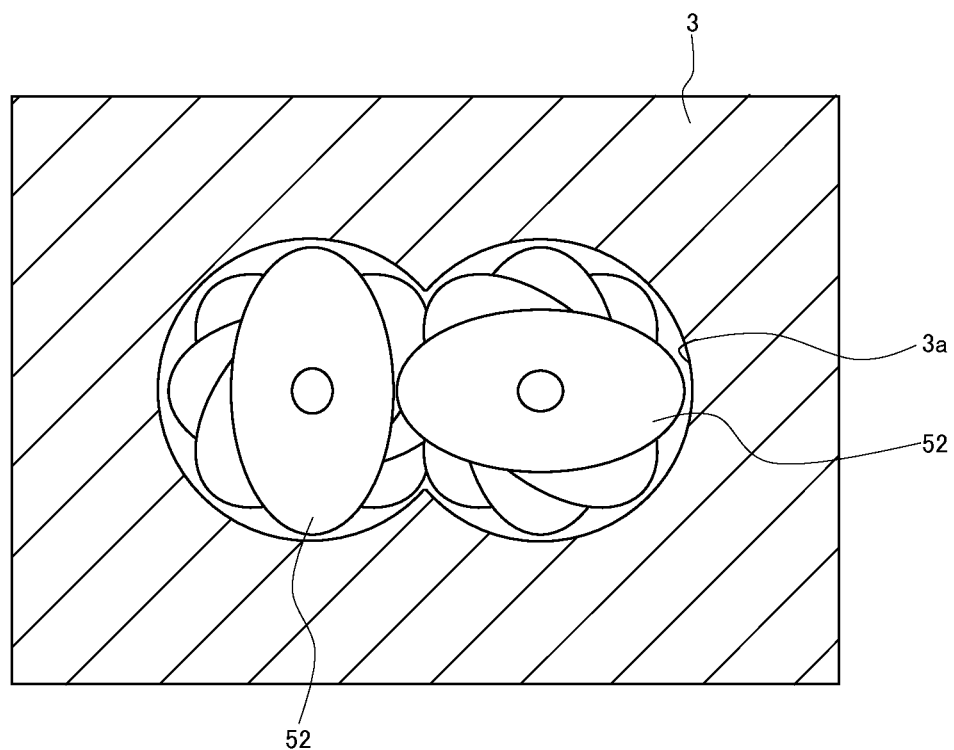
FIG. 5 is a cross-sectional view taken along V-V line of FIG. 1 and V-V line of FIG. 2.

The kneading disks 52 have a cross-sectional shape such as a pseudo-elliptical shape, an oval shape, or a truncated triangle shape and a constant thickness and are used in a state in which the plural kneading disks 52 are stacked while shifting the axis of symmetry of the cross-sectional shape by a predetermined angle and are fixed so that the screw axis corresponds to the rotation center axis of the cross-sectional shape. Here, FIG. 5 is a cross-sectional view taken along line V-V of FIG. 1 and line V-V of FIG. 2, and the cross-sectional view illustrated in FIG. 5 is a cross-sectional view of a kneading disk 52 portion of the extruder 1. FIGS. 3 and 5 illustrate a form in which the kneading disks 52 have a pseudo-elliptical cross-sectional shape and five disks are stacked and shifted by 45 degrees. In the first embodiment, however, the kneading disks 52 are not particularly limited to such a form, and the plural kneading disks 52 can be combined at a predetermined shift angle thereby to achieve forward feed kneading disks, neutral kneading disks, or backward feed kneading disks. The forward feed kneading disks refer to a plurality of kneading disks 52 that are shifted in phase in the forward feed direction (e.g., shifted by 45° or 60°) to have a feeding capability in the forward feed direction, and the backward feed kneading disks refer to a plurality of kneading disks 52 that are shifted in phase in the backward feed direction (e.g., shifted by 270°) to have a feeding capability in the backward feed direction. The neutral kneading disks refer to a plurality of kneading disks 52 that are shifted by 90° and formed in parallel in the axial direction so as not to have a feeding capacity.

In FIGS. 3 and 5, the kneading disks 52 have a pseudo-elliptical cross-sectional shape. The pseudo-elliptical shape refers to a shape obtained by cutting both end portions of the longer diameter of the ellipse at arcs centered on the rotation center of the figure. The oval shape refers to a shape obtained by cutting both end portions of the parallel strips at arcs centered on the rotation center of the figure. The truncated triangle shape refers to a shape obtained by cutting portions including respective vertices of a regular triangle at arcs centered on the rotation center of the figure. In any shape, the end portions of each disk are provided to maintain a clearance (gap) of about 0.1 to 5 mm on an inner wall surface 3a of the barrel 3. In the case of an oval shape or a truncated triangle, each side may be in a concave shape such as a drum shape or a triangular spool shape.

In the first embodiment, the screw configuration of the screw 5 in a portion corresponding to the first washing water feed port 380 is preferably composed of a plurality of kneading disks 52. This screw configuration is famed in the barrel block 38 which constitutes a part of the washing/dewatering zone 104. Thus, the portion of the screw 5 corresponding to the first washing water feed port 380 is composed of a plurality of kneading disks 52, and the water pressure of the washing water can thereby be appropriately increased when the washing water is supplied from the first washing water feed port 380, as will be described later.

In the first embodiment, a die 4 is connected to the downstream side of the above-described barrel block 48.

The die 4 is for extruding the nitrile rubber subjected to the coagulation/dewatering/drying processes in the barrel 3 into a predetermined shape and commercializing it. For example, the nitrile rubber can be extruded into a sheet-like shape. The die 4 is usually provided with a metal mesh for trapping foreign substances and the like on the upstream side of the discharge port.

A method of recovering nitrile rubber using the extruder 1 according to the first embodiment will then be described.

First, the latex of nitrile rubber, a coagulant, and water vapor are supplied to the coagulation zone 100, respectively, from the pipe connected to the feed port 320, from the pipe connected to the feed port 321, and from the pipe connected to the feed port 322. The coagulant is not particularly limited, but a salt of monovalent or divalent metal is preferably used from the viewpoint of controlling the polymer Mooney viscosity and the polymer pH within appropriate ranges thereby to ensure the processability or the like of the obtained nitrile rubber. Specific examples of the coagulant include calcium chloride, magnesium chloride, sodium chloride, magnesium sulfate, barium chloride, and the like. Among these, sodium chloride is preferably used from the viewpoint of excellent coagulation property.

The supply rates of the latex of nitrile rubber, the coagulant, and the water vapor into the coagulation zone 100 vary depending on the size of the extruder 1 or the like and are not particularly limited, but in the first embodiment, for example, the supply rate of the latex of nitrile rubber is preferably from 50 to 2000 kg/hr and more preferably from 150 to 600 kg/hr.

The amount of the coagulant in a coagulating liquid supplied from the feed port 321 is preferably from 0.5 to 200 parts by weight, more preferably from 1 to 150 parts by weight, and further preferably from 1.5 to 120 parts by weight, with respect to 100 parts by weight of the nitrile rubber contained in the latex of nitrile rubber. When the supply amount of the coagulant falls within the above range, the coagulation of the nitrile rubber can be sufficiently progressed, the uncoagulated content can be reduced, and the yield can be improved. The coagulant may be dissolved in water or the like and supplied as a coagulating liquid from the feed port 321. In this case, the concentration of the coagulant in the coagulating liquid is not particularly limited, but is preferably about 1 to 35 wt % with respect to the entire coagulating liquid.

The latex of nitrile rubber, the coagulant, and the water vapor supplied to the coagulation zone 100 are brought into contact with each other by the rotation of the screw 5, and the nitrile rubber is coagulated and suspended in water as crumbs having a diameter of about 0.5 to 100 mm to form a slurry liquid (crumb slurry) having a crumb concentration of about 1 to 30 wt %. The temperature inside the coagulation zone 100 is preferably from 20° C. to 100° C. and more preferably from 30° C. to 95° C. When the temperature of the coagulation zone 100 falls within such a range, the coagulation of the nitrile rubber can be sufficiently progressed with satisfactory coagulation of the nitrile rubber, the uncoagulated content can be reduced, and the yield can be improved.

The crumb slurry obtained in the coagulation zone 100 is sent to the drainage zone 102 by the rotation of the screw 5. In the drainage zone 102, a high-concentration coagulant contained in the crumb slurry is discharged as serum water from the slits 370 provided in the barrel block 37, and crumbs in a water-containing state that contain about 10 to 70 wt % of water are obtained.

The crumbs in a water-containing state obtained in the drainage zone 102 are sent to the washing/dewatering zone 104 by the rotation of the screw 5. In the washing/dewatering zone 104, washing water is introduced into the inside from the washing water feed port 380 provided in the barrel block 38, and the washing water and the crumbs are mixed to wash the crumbs, which are then dewatered. The drainage after the washing is discharged from the slits 390 provided in the barrel block 39.

In the first embodiment, when the washing water is supplied from the washing water feed port 380 in the washing/dewatering zone 104, the washing water is supplied under a water pressure of 0.2 MPa or more, and the crumbs are washed by mixing the washing water supplied under the water pressure of 0.2 MPa or more with the crumbs. Through this operation, according to the first embodiment, the crumbs can be washed more appropriately, and as a result, the amount of coagulant contained in the obtained nitrile rubber can be effectively reduced; therefore, it is possible to effectively prevent problems caused by a relatively large amount of the coagulant remaining, for example, deterioration of the properties of the obtained nitrile rubber, such as deterioration of the water resistance.

When the washing water is supplied from the washing water feed port 380, the water pressure of the washing water may be 0.2 MPa or more, but is preferably 0.22 MPa or more, more preferably 0.25 MPa or more, and further preferably 0.3 MPa or more. The upper limit of the water pressure of the washing water is not particularly limited, but is usually 15 MPa or less.

The method of setting the water pressure of the washing water to 0.2 MPa or more when supplying the washing water from the washing water feed port 380 is not particularly limited, but examples of the method include a method in which, for example, the screw configuration of the screw 5 in a portion corresponding to the first washing water feed port 380 (i.e., the screw configuration of the screw 5 at the outlet of the first washing water feed port 380) is composed of a plurality of the kneading disks 52. In particular, in the first embodiment, the water pressure of the washing water supplied to the first washing water feed port 380 can be controlled through composing the screw configuration of the screw 5 in a portion corresponding to the first washing water feed port 380 from a plurality of kneading disks 52 and adjusting the supply amount of the washing water.

In particular, when the portion of the screw 5 corresponding to the first washing water feed port 380 is composed of a plurality of kneading disks 52, the presence of the plurality of kneading disks 52 and the presence of crumbs kneaded by the plurality of kneading disks 52 reduce the space volume of that portion, and the diffusion in the barrel block 38 of the washing water supplied from the first washing water feed port 380 is suppressed (or a flow path is less likely to be ensured), so that the water pressure of the supplied washing water can be appropriately increased. When the portion corresponding to the first washing water feed port 380 is composed of a plurality of kneading disks 52, the disk configuration is not particularly limited, but preferably includes the forward feed kneading disks, the neutral kneading disks, or the backward feed kneading disks, and these may be combined.

In the first embodiment, the portion of the screw 5 corresponding to the first washing water feed port 380 may be composed of a plurality of kneading disks 52, but the following forms are preferred from the viewpoint of appropriately increasing the water pressure of the supplied washing water thereby to be able to efficiently reduce the amount of the coagulant contained in the obtained nitrile rubber. That is, the screw configuration of the screw 5 in the barrel block 38 formed with the first washing water feed port 380 is preferably configured such that the fraction occupied by the kneading disks 52 (fraction occupied in the longitudinal direction) is within a range from 5% to 100%, more preferably configured such that the fraction occupied by the kneading disks 52 is within a range from 10% to 100%, and further preferably configured such that the fraction occupied by the kneading disks 52 is within a range from 70% to 100%. Such a configuration can further improve the washing efficiency for the crumbs in the washing/dewatering zone 104.

In the entire washing/dewatering zone 104, the fraction occupied by the kneading disks 52 in the screw 5 (fraction occupied in the longitudinal direction) is not particularly limited, but is preferably from 5% to 85% and more preferably from 10% to 80% from the viewpoint of increasing the dewatering efficiency in addition to the washing efficiency.

Additionally or alternatively, examples of the method of setting the water pressure of the washing water to 0.2 MPa or more when supplying the washing water from the washing water feed port 380 include a method of controlling the rotation speed of the screw 5, a method of controlling the supply rate of the latex of nitrile rubber supplied from the feed port 320, a method of controlling the supply rate and/or supply amount of the washing water supplied from the washing water feed port 380, and the like. These methods can be adopted as substitute for or in addition to the above-described method in which the screw configuration of the screw 5 in a portion corresponding to the first washing water feed port 380 is composed of a plurality of the kneading disks 52.

The rotation speed of the screw 5 is not particularly limited, but is preferably from 10 to 1000 rpm and more preferably from 20 to 600 rpm. The supply rate of the latex of nitrile rubber supplied from the feed port 320 may be the above-described value, and the supply rate and/or supply amount of the washing water supplied from the washing water feed port 380 may be as follows.

That is, the supply rate of the washing water is not particularly limited, but is preferably from 10 to 400 L/hr, more preferably from 20 to 320 L/hr, and further preferably from 60 to 320 L/hr. Additionally or alternatively, the amount of washing water supplied from the first washing water feed port 380 is preferably from 25 to 1000 parts by weight and more preferably from 50 to 800 parts by weight with respect to 100 parts by weight of the nitrile rubber. When the supply rate of the washing water and the amount of the washing water fall within the above respective ranges, the washing effect in the washing/dewatering zone 104 can be further enhanced, and the amount of the coagulant contained in the obtained nitrile rubber can thereby be further effectively reduced. The temperature of the washing water is not particularly limited, but is preferably from 20° C. to 95° C., more preferably from 30° C. to 90° C., and further preferably from 45° C. to 75° C.

The internal temperature of the washing/dewatering zone 104 is preferably from 40° C. to 250° C. and more preferably from 50° C. to 230° C. In the washing/dewatering zone 104, washed crumbs containing about 2 to 20 wt % of water can be obtained.

Subsequently, the crumbs obtained in the washing/dewatering zone 104 are sent to the drying zone 106 by the rotation of the screw 5. The crumbs sent to the drying zone 106 are plasticized and kneaded by the rotation of the screw 5 to become a melt, which generates heat and is carried to the downstream side while raising the temperature. Then, when the melt reaches the vent ports 430, 460, and 470 provided in the barrel blocks 43, 46, and 47, the pressure is released, and the water contained in the melt is therefore separated and vaporized. This separated and vaporized water (vapor) is discharged to the outside through vent pipes (not illustrated). The temperature inside the drying zone 106 is preferably from 90° C. to 250° C. and more preferably from 100° C. to 230° C. The internal pressure (pressure at the die portion) is about 1000 to 15000 kPa (G: gauge pressure). The drying zone 106 may be depressurized.

The crumbs from which the water has been separated through the drying zone 106 are sent out to the outlet side by the screw 5 and introduced into the die 4 in a state of substantially containing almost no water (water content is 1.5 wt % or less), and the crumbs are discharged in a sheet-like shape from the die 4 and introduced into a sheet cutter (not illustrated) to be cut into an appropriate length.

Thus, the nitrile rubber can be recovered from the latex of nitrile rubber.

As described above, according to the first embodiment, when the washing water is supplied from the first washing water feed port 380 in the washing/dewatering zone 104, the washing water is supplied at a water pressure of 0.2 MPa or more, and the clams are washed by mixing the washing water supplied at a water pressure of 0.2 MPa or more and the clams. Through this operation, the amount of the coagulant contained in the obtained nitrile rubber can be effectively reduced.

<Method of Recovering Nitrile Rubber According to Second Embodiment>

The method of recovering nitrile rubber according to the second embodiment of the present invention will then be described.

Figure 6:
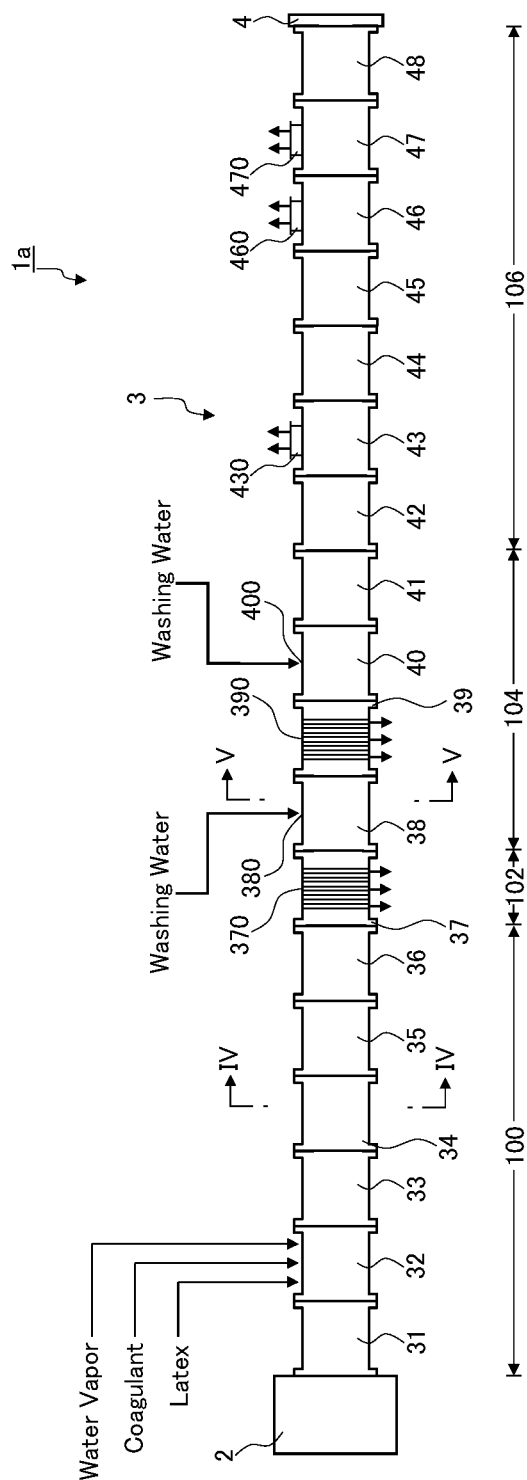
FIG. 6 is a schematic view illustrating an extruder used in the method of recovering nitrile rubber according to a second embodiment of the present invention.

FIG. 6 is a schematic view illustrating an extruder 1a used in the method of recovering nitrile rubber according to the second embodiment of the present invention.

In comparison with the above-described extruder 1 according to the first embodiment, the extruder 1a according to the second embodiment has the same configuration as the above-described extruder 1 according to the first embodiment except that the barrel block 40 is provided with a second washing water feed port 400 for supplying washing water.

The method of recovering nitrile rubber according to the second embodiment is the same as the above-described method of recovering nitrile rubber according to the first embodiment except that the extruder 1a illustrated in FIG. 6 is used and the form described below is adopted.

That is, as illustrated in FIG. 6, the extruder 1a according to the second embodiment includes the second washing water feed port 400 in addition to the first washing water feed port 380 in the washing/dewatering zone 104. In the second embodiment, in addition to the washing water from the first washing water feed port 380, washing water from the second washing water feed port 400 is supplied thereby to wash the crumbs.

In this operation, the water pressure of the washing water supplied from the first washing water feed port 380 may be 0.2 MPa or more, but is preferably 0.22 MPa or more, more preferably 0.25 MPa or more, and further preferably 0.3 MPa or more. The water pressure of the washing water supplied from the second washing water feed port 400 may also be 0.2 MPa or more, but is preferably 0.22 MPa or more, more preferably 0.25 MPa or more, and further preferably 0.3 MPa or more. The upper limit of the water pressure of the washing water supplied from the first washing water feed port 380 and the second washing water feed port 400 is not particularly limited, but is usually 15 MPa or less.

The method of setting the water pressure of the washing water to 0.2 MPa or more when supplying the washing water from the washing water feed port 380 and the second washing water feed port 400 is not particularly limited, but as in the above-described first embodiment, examples of the method include a method in which the screw configuration of the screw 5 in the portions corresponding to the first washing water feed port 380 and the second washing water feed port 400 (i.e., the screw configuration of the screw 5 at the outlets of the first washing water feed port 380 and the second washing water feed port 400) is composed of a plurality of the kneading disks 52. Additionally or alternatively, as in the above-described first embodiment, a method of controlling the rotation speed of the screw 5, a method of controlling the supply rate of the latex of nitrile rubber supplied from the feed port 320, a method of controlling the supply rate and/or supply amount of the washing water supplied from the washing water feed port 380, or the like may be adopted. In the second embodiment, the water pressure of the washing water supplied to the first washing water feed port 380 and the second washing water feed port 400 can be controlled through composing the screw configuration of the screw 5 in the portions corresponding to the first washing water feed port 380 and the second washing water feed port 400 from a plurality of kneading disks 52 and adjusting the supply amount of the washing.

In the second embodiment, the portions of the screw 5 corresponding to the first washing water feed port 380 and the second washing water feed port 400 may be composed of a plurality of kneading disks 52, but the following forms are preferred from the viewpoint of further appropriately increasing the water pressure of the supplied washing water thereby to be able to further effectively reduce the amount of the coagulant contained in the obtained nitrile rubber. That is, the screw configuration of the screw 5 in the barrel block 38 famed with the first washing water feed port 380 is preferably configured such that the fraction occupied by the kneading disks 52 (fraction occupied in the longitudinal direction) is within a range from 30% to 100% and more preferably configured such that the fraction occupied by the kneading disks 52 is within a range from 40% to 100%. Additionally or alternatively, the screw configuration of the screw 5 in the barrel block 40 famed with the second washing water feed port 400 is preferably configured such that the fraction occupied by the kneading disks 52 (fraction occupied in the longitudinal direction) is within a range from 5% to 100% and more preferably configured such that the fraction occupied by the kneading disks 52 is within a range from 10% to 100%.

The supply rate and supply amount of the washing water supplied from the first washing water feed port 380 may be set as in the above-described first embodiment. The supply rate of the washing water supplied from the second washing water feed port 400 is not particularly limited, but is preferably from 10 to 400 L/hr and more preferably from 20 to 320 L/hr, and the amount of washing water supplied from the second washing water feed port 400 is preferably from 25 to 1000 parts by weight and more preferably from 50 to 800 parts by weight with respect to 100 parts by weight of the nitrile rubber. When the supply rate of the washing water and the amount of the washing water fall within the above respective ranges, the washing effect in the washing/dewatering zone 104 can be further enhanced, and the amount of the coagulant contained in the obtained nitrile rubber can thereby be further effectively reduced. The temperature of the washing water is not particularly limited, but is preferably from 20° C. to 95° C. and more preferably from 30° C. to 90° C.

The internal temperature of the washing/dewatering zone 104 may be set as in the above-described first embodiment. In the washing/dewatering zone 104, washed crumbs containing about 5 to 10 wt % of water can be obtained. Subsequently, the crumbs obtained in the washing/dewatering zone 104 are dried in the drying zone 106, discharged in a sheet-like shape from the die 4, and then introduced into a sheet cutter (not illustrated) to be cut into an appropriate length.

Thus, the nitrile rubber can be recovered from the latex of nitrile rubber.

As described above, according to the second embodiment, the crumbs are washed through supplying the washing water from the second washing water feed port 400 in addition to the first washing water feed port 380 in the washing/dewatering zone 104 and setting the water pressure of the washing water from the first washing water feed port 380 and the second washing water feed port 400 to 0.2 MPa or more, and the amount of the coagulant contained in the obtained nitrile rubber can thereby be further effectively reduced.

Other Embodiments

The above-described first and second embodiments have been exemplified as the forms in which the extruder 1, 1*a* including the coagulation zone 100 and the drainage zone 102 is used, the latex of nitrile rubber is coagulated in the extruder 1, 1*a*, and the water-containing crumbs comprising the crumb-like nitrile rubber obtained by coagulation in the extruder 1, 1*a* are washed and dewatered in the washing/dewatering zone 104, but the embodiments of the present invention are not particularly limited to such forms. For example, in another form, an extruder that includes neither the coagulation zone 100 nor the drainage zone 102 may be used, and water-containing crumbs comprising crumb-like nitrile rubber obtained by coagulation in another apparatus may be supplied in a state of the water-containing crumbs to the extruder to perform washing and dewatering.

Moreover, the above-described first and second embodiments have been exemplified as the forms in which the extruder 1, 1*a* including the drying zone 106 is used, and the crumbs washed and dewatered in the washing/dewatering zone 104 are dried in the drying zone 106, but the embodiments of the present invention are not particularly limited to such forms. For example, in another form, an extruder that does not include the drying zone 106 may be used, and the crumbs washed and dewatered in the washing/dewatering zone 104 are discharged in a state of the crumbs from the extruder and dried in another drying apparatus.

Furthermore, the above-described first and second embodiments have been exemplified as the forms in which when the latex of nitrile rubber is coagulated in the extruder 1, 1*a*, the latex of nitrile rubber, the coagulant, and the water vapor are supplied from the feed ports 320, 321, and 322, but in another form, the coagulation may be performed by supplying only the latex of nitrile rubber and the coagulant without supplying water vapor.

Thus, in the present embodiments, the nitrile rubber can be recovered. Then, the nitrile rubber recovered in this way can be used as a rubber composition, for example, by blending a cross-linking agent. The cross-linking agent is not particularly limited, but a polyamine-based cross-linking agent can be preferably used from the viewpoint of further enhancing the compression set resistance in the obtained cross-linked rubber. The content of the cross-linking agent in the rubber composition of the present invention is not particularly limited, but is preferably 0.1 to 20 parts by weight, more preferably 0.2 to 15 parts by weight, and further preferably 0.5 to 10 parts by weight with respect to 100 parts by weight of the nitrile rubber.

In addition, other than the cross-linking agent, a compounding agent commonly used in the rubber field may be blended to the rubber composition of the present invention. Examples of such a compounding agent include fillers, metal oxides such as zinc oxide and magnesium oxide, $\alpha,\beta$-ethylenically unsaturated carboxylic acid metal salts such as zinc methacrylate and zinc acrylate, cross-linking accelerators, co-cross-linking agents, cross-linking aids, cross-linking retarders, antiaging agents, antioxidants, light stabilizers, scorch inhibitors such as primary amine, activators such as diethylene glycol, silane coupling agents, plasticizers, processing aids, glidants, pressure-sensitive adhesives, lubricants, flame retardants, antifungal agents, acid receiving agents, antistatic agents, pigments, forming agents, and the like. The blending amounts of these compounding agents are not particularly limited and the compounding agents can be blended in the amounts according to the compounding purposes so long as the amounts are within ranges not impairing the object and the effects of the present invention. Furthermore, the rubber composition of the present invention may contain rubber other than the nitrile rubber.

The above-described rubber composition can be made into a cross-linked rubber by cross-linking.

The cross-linked rubber of the present invention can be produced as follows: the rubber composition of the present invention is used, the composition is formed by using a forming machine corresponding to the desired shape, such as an extruder, an injection molding machine, a compressor, or a roll, the cross-linking reaction is performed by heating the famed product, and thus the shape of the famed product is fixed as a cross-linked product. In this case, the cross-linking may be performed after preliminarily performing the forming, or alternatively, the forming and the cross-linking may be performed simultaneously. The forming temperature is usually 10° C. to 200° C. and preferably 25° C. to 120° C. The cross-linking temperature is usually 100° C. to 200° C. and preferably 130° C. to 190° C., and the cross-linking time is usually 1 minute to 24 hours and preferably 2 minutes to 1 hour.

Embodiments of the present invention have been heretofore explained, but these embodiments are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described more specifically by way of Examples and Comparative Examples. Unless otherwise stated, "parts" in each example are parts by weight.

Various physical properties were evaluated in accordance with the following methods.

<Content Ratio of Each Monomer Unit Constituting Hydrogenated Nitrile Rubber>

The content ratio of the mono-n-butyl maleate unit was calculated as follows. To 0.2 g of a 2-mm square piece of the hydrogenated nitrile rubber, 100 mL of 2-butanone was added. The mixture was stirred for 16 hours, and then 20 mL of ethanol and 10 mL of water were added to the mixture. While stirring, a titration was performed at room temperature by using a 0.02 N hydrous ethanol solution of potassium hydroxide and thymolphthalein as an indicator, and thus the number of moles of the carboxyl group with respect to 100 g of the hydrogenated nitrile rubber was determined. Then, the determined number of moles was converted into the content of the mono-n-butyl maleate unit.

The content ratios of the 1,3-butadiene unit and saturated butadiene unit were calculated by measuring the iodine values before and after the hydrogenation reaction (in accordance with JIS K 6235) using the hydrogenated nitrile rubber.

The content ratio of the acrylonitrile unit was calculated by measuring the nitrogen content in the hydrogenated nitrile rubber using the Kjeldahl method in accordance with JIS K6384.

The content ratios of the n-butyl acrylate unit and 2-methoxyethyl acrylate unit were calculated as the remaining components for the above monomer units.

<Moony Viscosity of Hydrogenated Nitrile Rubber>

The Mooney viscosity (ML1+4, 100° C.) of the hydrogenated nitrile rubber was measured at 100° C. in accordance with JIS K6300.

<Chlorine Content and Sodium Content in Hydrogenated Nitrile Rubber>

To 0.5 g of the hydrogenated nitrile rubber, 70 ml of methyl ethyl ketone was added and they were stirred to completely dissolve the hydrogenated nitrile rubber. Subsequently, 30 ml of isopropyl alcohol was added, and methyl ethyl ketone was further added to adjust the total volume to 150 ml. Then, 1 ml of a 2% sulfuric acid solution was added to that solution using a Komagome pipette, and an N/200 silver nitrate aqueous solution was dropped to perform potentiometric titration, thereby obtaining the chlorine content. In addition, assuming that the measured chlorine was derived from sodium chloride, the sodium content was determined from the obtained chlorine content. COMITE-101 available from HIRANUMA Co., Ltd. was used as the titrator, and the silver support electrode AG-68/silver reference electrode AM-44 set was used.

Production Example 1, Production of Latex of Hydrogenated Nitrile Rubber (L1)

In a metallic bottle, 180 parts of ion exchanged water, 25 parts of an aqueous solution of sodium dodecylbenzenesulfonate having a concentration of 10 wt %, 5 parts of a sodium salt of a formalin condensate of naphthalenesulfonate having a concentration of 10%, 20.4 parts of acrylonitrile, 5 parts of mono-n-butyl maleate, 35.2 parts of n-butyl acrylate, and 0.75 parts of t-dodecyl mercaptan (molecular weight adjuster) were added in this order, the gas inside the metallic bottle was replaced with nitrogen three times, and then 39.4 parts of 1,3-butadiene was charged into the metallic bottle. The metallic bottle was held at 10° C., 0.1 parts of cumene hydroperoxide (polymerization initiator) was charged into the metallic bottle, the polymerization reaction was continued while stirring, and when the polymerization conversion rate reached 80%, 4 parts of 2,2,6,6-tetramethylpiperidin-1-oxyl aqueous solution (polymerization terminator) having a concentration of 2.5 wt % was added to terminate the polymerization reaction. Then, the residual monomers were removed at a water temperature of 60° C., and latex of nitrile rubber (X1) (solid content concentration of 25 wt %) was obtained.

Separately from the above, to palladium chloride (2800 ppm by weight as the weight ratio of Pd metal in palladium chloride/nitrile rubber in latex), an aqueous solution containing sodium chloride twice the molar equivalent of the Pd metal in the palladium chloride was added to obtain a palladium aqueous solution. Then, to 300 parts of the obtained palladium aqueous solution, polyvinylpyrrolidone having a weight-average molecular weight of 5000 was added in an amount 5 times by the weight ratio with respect to the Pd metal in the palladium chloride, and a potassium hydroxide aqueous solution was further added to prepare a catalyst aqueous solution having pH of 12.0.

Then, in an autoclave, the latex of nitrile rubber (X1) obtained as above and the catalyst aqueous solution prepared as above were added in such a way that the content of palladium was 2800 ppm by weight with respect to the dry weight of the rubber contained in the latex of nitrile rubber (X1) obtained as above, then, a hydrogenation reaction was performed at a hydrogen pressure of 3 MPa and a temperature of 50° C. for 6 hours, and an appropriate amount of an antiaging agent was added to obtain latex of hydrogenated nitrile rubber (L1) (solid content concentration: 13.0 wt %). The composition of the hydrogenated nitrile rubber contained in the obtained latex of hydrogenated nitrile rubber (L1) was 20.5 wt % of the acrylonitrile unit, 45.5 wt % of the 1,3-butadiene unit (including the saturated portion), 5.0 wt % of the mono n-butyl maleate, and 29 wt % of the n-butyl acrylate, and the iodine value was 7.

Production Example 2, Production of Latex of Hydrogenated Nitrile Rubber (L2)

Latex of hydrogenated nitrile rubber (L2) (solid content concentration: 13.0 wt %) was obtained in the same manner as in Production Example 1 except that the amount of acrylonitrile used was 15.7 parts, the amount of n-butyl acrylate used was 36.2 parts, and the amount of 1,3-butadiene used was 43.1 parts. The composition of the hydrogenated nitrile rubber contained in the obtained latex of hydrogenated nitrile rubber (L2) was 15.5 wt % of the acrylonitrile unit, 46 wt % of the 1,3-butadiene unit (including the saturated portion), 5 wt % of the mono n-butyl maleate, and 33.5 wt % of the n-butyl acrylate, and the iodine value was 8.

Production Example 3, Production of Latex of Hydrogenated Nitrile Rubber (L3)

Latex of hydrogenated nitrile rubber (L3) (solid content concentration: 13.0 wt %) was obtained in the same manner as in Production Example 1 except that the amount of acrylonitrile used was 23 parts, the amount of 1,3-butadiene used was 40 parts, the amount of mono-n-butyl maleate used was 6.5 parts, and 30.5 parts of 2-methoxyethyl acrylate was used as substitute for the n-butyl acrylate. The composition of the hydrogenated nitrile rubber contained in the obtained latex of hydrogenated nitrile rubber (L3) was 24 wt % of the acrylonitrile unit, 44 wt % of the butadiene unit (including the saturated portion), 6.5 wt % of the mono n-butyl maleate, and 25 wt % of the 2-methoxyethyl acrylate, and the iodine value was 7.

Production Example 4, Production of Latex of Hydrogenated Nitrile Rubber (L4)

Latex of hydrogenated nitrile rubber (L4) (solid content concentration: 13.0 wt %) was obtained in the same manner as in Production Example 1 except that the amount of acrylonitrile used was 63 parts, the amount of 1,3-butadiene used was 37 parts, and the n-butyl acrylate and the mono-n-butyl maleate were not used. The composition of the hydrogenated nitrile rubber contained in the obtained latex of hydrogenated nitrile rubber (L4) was 37 wt % of the acrylonitrile unit and 63 wt % of the 1,3-butadiene unit (including the saturated portion), and the iodine value was 7.

Example 1

The latex of hydrogenated nitrile rubber (L1) obtained in Production Example 1 was adjusted to pH=3.6 and a solid content concentration of 12.0 wt % using a sulfuric acid aqueous solution, and the hydrogenated nitrile rubber was recovered through coagulating, washing, dewatering, and drying the latex of hydrogenated nitrile rubber (L1) with the extruder 1 illustrated in FIG. 1 using a sodium chloride aqueous solution (concentration: 25 wt %) as the coagulation liquid and water vapor.

A biaxial meshing type screw extruder was used as the extruder 1. The biaxial meshing type screw extruder is in a state in which two screws (cylinder diameter=47 mm, L/Da=63) 5 and 5 are provided in parallel in the barrel 3, these screws 5 and 5 are rotationally driven in the same direction, the crest portions of one screw are meshed with the root portions of the other screw, and the root portions of the one screw are meshed with the crest portions of the other screw.

The axial screw length L1 of the region corresponding to the coagulation zone 100 was set to 931 mm, the axial screw length L2 of the region corresponding to the drainage zone 102 was set to 161 mm, the axial screw length L3 of the region corresponding to the washing/dewatering zone 104 was set to 678 mm, and the axial screw length L4 of the region corresponding to the drying zone 106 was set to 1058 mm.

In Example 1, a screw configuration α listed in Table 1 below was adopted for the two screws 5 and 5, and the set temperature of each barrel block was as follows: the barrel blocks 31 to 39: 90° C., the barrel blocks 40 to 43: 130° C. to 140° C., and the barrel blocks 44 to 48: 120° C. to 130° C.

TABLE 1

|  | Barrel block 38 | Barrel block 40 |
|---|---|---|
| Screw configuration α | BAAAAC | DDDDAA |
| Screw configuration β | BAAAAC | DDBAAA |
| Screw configuration γ | BDDDCC | DDDDAA |
| Screw configuration δ | BDDDDC | DDDDDA |

In Table 1, "A" represents forward feed kneading disks, "B" represents neutral kneading disks, "C" represents backward feed kneading disks, and "D" represents a full-flight screw.

As can be confirmed from Table 1, in the screw configuration α, the screw configuration in the portion corresponding to the first washing water feed port 380 is composed of a plurality of kneading disks, while in the screw configuration γ, the screw configuration in the portion corresponding to the first washing water feed port 380 is composed of screw blocks rather than a plurality of kneading disks. Moreover, in the screw configuration α, the fraction occupied by the kneading disks of the screw in the barrel block 38 (fraction occupied in the longitudinal direction) is 100%.

Likewise, in the screw configuration β, the screw configuration in the portions corresponding to the first washing water feed port 380 and the second washing water feed port 400 is composed of a plurality of kneading disks, while in the screw configuration δ, the screw configuration in the portions corresponding to the first washing water feed port 380 and the second washing water feed port 400 is composed of screw blocks rather than a plurality of kneading disks. Moreover, in the screw configuration β, the fraction occupied by the kneading disks of the screw in the barrel block 38 (fraction occupied in the longitudinal direction) is 100%, and the fraction occupied by the kneading disks of the screw in the barrel block 40 (fraction occupied in the longitudinal direction) is 67%.

From the feed port 320 provided in the barrel block 32 of the extruder 1 having such a configuration, the latex of hydrogenated nitrile rubber (L1) adjusted to pH=3.6 and a solid content concentration of 12.0 wt % was started to be continuously supplied at a rate of 330 kg/hr. At the same time, from the feed port 321 provided in the barrel block 32, a sodium chloride aqueous solution (coagulant concentration: 25 wt %) was started to be continuously supplied at a rate of 96 kg/hr, and from the feed port 322 provided in the barrel block 32, water vapor was started to be continuously supplied at a pressure of 0.35 MPa and a rate of 70 kg/hr. That is, the concentration of the coagulant with respect to the total amount of serum water when passing through the feed port 321 (amount of sodium chloride/amount of serum water composed of the total supply) was set to 4.8 wt %, or the amount of sodium chloride was set to 60 parts per 100 parts of the hydrogenated nitrile rubber. At the same time, from the first washing water feed port 380 provided in the barrel block 38, the washing water at a temperature of 60° C. was started to be continuously supplied under a condition of 300 L/hr (an amount to be 750 parts per 100 parts of the hydrogenated nitrile rubber), and the hydrogenated nitrile rubber was continuously recovered at a rate of 40 kg/hr by operating the extruder 1 at a screw rotation speed of 200 rpm to continuously coagulate, wash, dewater, and dry the latex of hydrogenated nitrile rubber (L1). In this operation, when the water pressure of the washing water supplied from the first washing water feed port 380 provided in the barrel block 38 was measured using a water pressure gauge provided in the vicinity of the first washing water feed port 380, it was 4.0 MPa.

Then, for the recovered hydrogenated nitrile rubber, the Mooney viscosity, chlorine content, and sodium content were measured in accordance with the above methods. The results are listed in Table 2.

Example 2

The hydrogenated nitrile rubber was continuously recovered at a rate of 40 kg/hr by operating the extruder 1 to continuously coagulate, wash, dewater, and dry the latex of hydrogenated nitrile rubber (L1) in the same manner as in Example 1 except that the supply rate of the washing water supplied from the first washing water feed port 380 was changed to 180 L/hr (an amount to be 450 parts per 100 parts of the hydrogenated nitrile rubber). In this operation, when the water pressure of the washing water supplied from the first washing water feed port 380 was measured in the same manner as in Example 1, it was 1.3 MPa. Then, the recovered hydrogenated nitrile rubber was evaluated in the same manner as in Example 1. The results are listed in Table 2.

Example 3

The hydrogenated nitrile rubber was continuously recovered at a rate of 40 kg/hr by operating the extruder 1 to continuously coagulate, wash, dewater, and dry the latex of hydrogenated nitrile rubber (L1) in the same manner as in Example 1 except that the supply rate of the washing water supplied from the first washing water feed port 380 was changed to 80 L/hr (an amount to be 200 parts per 100 parts of the hydrogenated nitrile rubber). In this operation, when the water pressure of the washing water supplied from the first washing water feed port 380 was measured in the same manner as in Example 1, it was 0.6 MPa. Then, the recovered hydrogenated nitrile rubber was evaluated in the same manner as in Example 1. The results are listed in Table 2.

Example 4

Except that the latex of hydrogenated nitrile rubber (L2) obtained in Production Example 2 was adjusted to pH=3.6 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L2) in the same manner as in Example 2. In this operation, when the water pressure of the washing water supplied from the first washing water feed port 380 was measured in the same manner as in Example 1, it was 1.4 MPa. Then, the recovered hydrogenated nitrile rubber was evaluated in the same manner as in Example 1. The results are listed in Table 2.

Example 5

Except that the latex of hydrogenated nitrile rubber (L3) obtained in Production Example 3 was adjusted to pH=3.7 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L3) in the same manner as in Example 2. In this operation, when the water pressure of the washing water supplied from the first washing water feed port 380 was measured in the same manner as in Example 1, it was 1.1 MPa. Then, the recovered hydrogenated nitrile rubber was evaluated in the same manner as in Example 1. The results are listed in Table 2.

Example 6

Except that the latex of hydrogenated nitrile rubber (L4) obtained in Production Example 4 was adjusted to pH=3.6 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L4) in the same manner as in Example 2. In this operation, when the water pressure of the washing water supplied from the first washing water feed port 380 was measured in the same manner as in Example 1, it was 1.1 MPa. Then, the recovered hydrogenated nitrile rubber was evaluated in the same manner as in Example 1. The results are listed in Table 2.

Example 7

In Example 7, the extruder 1a illustrated in FIG. 6 was used as substitute for the extruder 1 illustrated in FIG. 1 to recover the hydrogenated nitrile rubber through coagulating, washing, dewatering, and drying the latex of hydrogenated nitrile rubber (L1) adjusted to pH=3.6 and a solid content concentration of 12.0 wt %.

The extruder 1a having the same configuration as that of the extruder 1 used in Example 1 was used except that, as illustrated in FIG. 6, the extruder 1a included the second washing water feed port 400 in the barrel block 40 and the two screws 5 and 5 were those having the screw configuration β as listed in the above Table 1. The set temperature of each barrel block was as follows: the barrel blocks 31 to 39: 90° C., the barrel blocks 40 to 43: 130° C., and the barrel blocks 44 to 48: 130° C.

The hydrogenated nitrile rubber was continuously recovered at a rate of 40 kg/hr through continuously coagulating, washing, dewatering, and drying the latex of hydrogenated nitrile rubber (L1) in the same manner as in Example 1 except that the operating conditions of the extruder 1a were set such that the supply rate of the washing water from the first washing water feed port 380 provided in the barrel block 38 was 180 L/hr and the supply rate of the washing water from the second washing water feed port 400 provided in the barrel block 40 was 80 L/hr. In this operation, when the water pressure of the washing water supplied from the first washing water feed port 380 provided in the barrel block 38 was measured using a water pressure gauge provided in the vicinity of the first washing water feed port 380, it was 0.8 MPa, and when the water pressure of the washing water supplied from the second washing water feed port 400 provided in the barrel block 40 was measured using a water pressure gauge provided in the vicinity of the second washing water feed port 400, it was 1.0 MPa. Then, the recovered hydrogenated nitrile rubber was evaluated in the same manner as in Example 1. The results are listed in Table 2.

Comparative Example 1

In Comparative Example 1, the hydrogenated nitrile rubber was continuously recovered at a rate of 40 kg/hr by operating the extruder 1 illustrated in FIG. 1 to continuously coagulate, wash, dewater, and dry the latex of hydrogenated nitrile rubber (L1) in the same manner as in Example 1 except that, in the extruder 1 illustrated in FIG. 1, the two screws 5 and 5 used were those having the screw configuration γ as listed in the above Table 1. In this operation, when the water pressure of the washing water supplied from the first washing water feed port 380 was measured in the same manner as in Example 1, it was 0.02 MPa. Then, the recovered hydrogenated nitrile rubber was evaluated in the same manner as in Example 1. The results are listed in Table 2.

Comparative Example 2

The hydrogenated nitrile rubber was continuously recovered at a rate of 40 kg/hr by operating the extruder 1 to continuously coagulate, wash, dewater, and dry the latex of hydrogenated nitrile rubber (L1) in the same manner as in Comparative Example 1 except that the supply rate of the washing water supplied from the first washing water feed port 380 was changed to 180 L/hr (an amount to be 450 parts per 100 parts of the hydrogenated nitrile rubber). In this operation, when the water pressure of the washing water supplied from the first washing water feed port 380 was measured in the same manner as in Example 1, it was 0.01 MPa. Then, the recovered hydrogenated nitrile rubber was evaluated in the same manner as in Example 1. The results are listed in Table 2.

Comparative Example 3

The hydrogenated nitrile rubber was continuously recovered at a rate of 40 kg/hr by operating the extruder 1 to continuously coagulate, wash, dewater, and dry the latex of hydrogenated nitrile rubber (L1) in the same manner as in Comparative Example 1 except that the supply rate of the washing water supplied from the first washing water feed port 380 was changed to 80 L/hr (an amount to be 200 parts per 100 parts of the hydrogenated nitrile rubber). In this operation, when the water pressure of the washing water supplied from the first washing water feed port 380 was measured in the same manner as in Example 1, it was 0.005 MPa. Then, the recovered hydrogenated nitrile rubber was evaluated in the same manner as in Example 1. The results are listed in Table 2.

Comparative Example 4

Except that the latex of hydrogenated nitrile rubber (L2) obtained in Production Example 2 was adjusted to pH=3.6 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L2) in the same manner as in Comparative Example 2. In this operation, when the water pressure of the washing water supplied from the first washing water feed port 380 was measured in the same manner as in Example 1, it was 0.01 MPa. Then, the recovered hydrogenated nitrile rubber was evaluated in the same manner as in Example 1. The results are listed in Table 2.

Comparative Example 5

Except that the latex of hydrogenated nitrile rubber (L3) obtained in Production Example 3 was adjusted to pH=3.7 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L3) in the same manner as in Comparative Example 2. In this operation, when the water pressure of the washing water supplied from the first washing water feed port 380 was measured in the same manner as in Example 1, it was 0.01 MPa. Then, the recovered hydrogenated nitrile rubber was evaluated in the same manner as in Example 1. The results are listed in Table 2.

Comparative Example 6

Except that the latex of hydrogenated nitrile rubber (L4) obtained in Production Example 4 was adjusted to pH=3.6 and a solid content concentration of 12.0 wt % and used as substitute for the latex of hydrogenated nitrile rubber (L1) obtained in Production Example 1, the hydrogenated nitrile rubber was continuously recovered at a rate of 40 kg/hr by operating the extruder 1 to continuously coagulate, wash, dewater, and dry the latex of hydrogenated nitrile rubber (L4) in the same manner as in Comparative Example 2. In this operation, when the water pressure of the washing water supplied from the first washing water feed port 380 was measured in the same manner as in Example 1, it was 0.01 MPa. Then, the recovered hydrogenated nitrile rubber was evaluated in the same manner as in Example 1. The results are listed in Table 2.

Comparative Example 7

In Comparative Example 1, the hydrogenated nitrile rubber was continuously recovered at a rate of 40 kg/hr by operating the extruder 1a illustrated in FIG. 6 to continuously coagulate, wash, dewater, and dry the latex of hydrogenated nitrile rubber (L1) in the same manner as in Example 7 except that, in the extruder 1a, the two screws 5 and 5 used were those having the screw configuration δ as listed in the above Table 1. In this operation, when the water pressures of the washing water supplied from the first washing water feed port 380 and the second washing water feed port 400 were measured in the same manner as in Example 7, they were 0.01 MPa and 0.005 MPa, respectively. Then, the recovered hydrogenated nitrile rubber was evaluated in the same manner as in Example 1. The results are listed in Table 2.

[Table 2]

TABLE 2

|  |  | Examples |  |  |  |  |  |  | Comparative Examples |  |
|---|---|---|---|---|---|---|---|---|---|---|
|  |  | 1 | 2 | 3 | 4 | 5 | 6 | 7 | 1 | 2 |
| Type of latex of hydrogenated nitrile rubber used for recovery |  | L1 | L1 | L1 | L2 | L3 | L4 | L1 | L1 | L1 |
| Screw configuration of barrel blocks 33, 40 |  | α | α | α | α | α | α | β | γ | γ |
| First washing water feed port 330 | Amount of washing water [L/hr] | 300 | 130 | 80 | 180 | 180 | 180 | 180 | 300 | 180 |
|  | Pressure of washing water [MPa] | 4.0 | 1.3 | 0.6 | 1.4 | 1.1 | 1.1 | 0.8 | 0.02 | 0.01 |
| Second washing water feed port 400 | Amount of washing water [L/hr] | — | — | — | — | — | — | 80 | — | — |
|  | Pressure of washing water [MPa] | — | — | — | — | — | — | 1.0 | — | — |
| Mooney viscosity of hydrogenated nitrile rubber (ML1 + 4, 100° C.) |  | 47.2 | 46.8 | 47.7 | 45.3 | 49.2 | 50.6 | 46.2 | 43.1 | 46.2 |
| Chlorine content in hydrogenated nitrile rubber [ppm by weight] |  | 1002 | 1038 | 1112 | 1075 | 1061 | 958 | 711 | 2237 | 2348 |
| Sodium content in hydrogenated nitrile rubber [ppm by weight] |  | 650 | 673 | 721 | 697 | 688 | 621 | 461 | 1451 | 1523 |

|  |  | Comparative Examples |  |  |  |  |
|---|---|---|---|---|---|---|
|  |  | 3 | 4 | 5 | 6 | 7 |
| Type of latex of hydrogenated nitrile rubber used for recovery |  | L1 | L2 | L3 | L4 | L1 |
| Screw configuration of barrel blocks 33, 40 |  | γ | γ | γ | γ | δ |
| First washing water feed port 330 | Amount of washing water [L/hr] | 80 | 180 | 180 | 180 | 180 |
|  | Pressure of washing water [MPa] | 0.005 | 0.01 | 0.01 | 0.01 | 0.01 |
| Second washing water feed port 400 | Amount of washing water [L/hr] | — | — | — | — | 80 |
|  | Pressure of washing water [MPa] | — | — | — | — | 0.005 |
| Mooney viscosity of hydrogenated nitrile rubber (ML1 + 4, 100° C.) |  | 46.6 | 44.9 | 48.5 | 51 | 47.5 |
| Chlorine content in hydrogenated nitrite rubber [ppm by weight] |  | 2398 | 2237 | 2157 | 2194 | 1744 |
| Sodium content in hydrogenated nitrile rubber [ppm by weight] |  | 1555 | 1451 | 1399 | 1423 | 1131 |

As listed in Table 2, the results can be confirmed that when the washing is performed through configuring the screw configuration in the portion corresponding to the first washing water feed port 380 from a plurality of kneading disks and setting the water pressure of the washing water supplied from the first washing water feed port 380 to 0.2 MPa or more, the recovered nitrile rubbers all have a suppressed content of chlorine and sodium due to the coagulant while maintaining the Mooney viscosity in an appropriate range (Examples 1 to 6).

Moreover, when the washing is performed through adopting the configuration in which the washing water is supplied from two sites of the first washing water feed port 380 and the second washing water feed port 400, configuring the screw configuration in each of the portions corresponding to the first washing water feed port 380 and the second washing water feed port 400 from a plurality of kneading disks, and setting the water pressure of the washing water supplied from each of the first washing water feed port 380 and the second washing water feed port 400 to 0.2 MPa or more, the recovered nitrile rubber has a further suppressed content of chlorine and sodium due to the coagulant (Example 7).

On the other hand, when the water pressure of the washing water supplied from the first washing water feed port 380 is 0.005 to 0.02 MPa, or when the water pressure of the washing water supplied from the first washing water feed port 380 is 0.005 to 0.02 MPa even in a case in which the washing water is supplied from two sites of the first washing water feed port 380 and the second washing water feed port 400, the result is that the recovered nitrile rubber has a high chlorine content and a high sodium content due to the coagulant (Comparative Examples 1 to 7).

DESCRIPTION OF REFERENCE NUMERALS

1,1a Extruder
2 Drive unit
3 Barrel
31 to 48 Barrel block
380 First washing water feed port
400 Second washing water feed port
4 Die
5 Screw

The invention claimed is:

1. A method of recovering nitrile rubber from water-containing crumbs comprising crumb-like nitrile rubber using an extruder in which a screw is disposed inside a barrel so as to be capable of being rotationally driven, the barrel being formed with at least a washing/dewatering zone, the method comprising
  supplying washing water to the washing/dewatering zone at a water pressure of 0.2 MPa or higher while mixing the crumb-like nitrile rubber and the supplied washing water in the washing/dewater zone, thereby washing and dewatering the crumb-like nitrile rubber,
  wherein
  the screw for use comprises a kneading disk provided at a site corresponding to a supply position for the washing water,
  the extruder for use has a plurality of barrel blocks, and a screw configuration of the screw in a barrel block formed with a supply port for supplying the washing water is such that a fraction occupied by the kneading disk in a longitudinal direction is within a range from 70% to 100%, and
  wherein the nitrile rubber contains chlorine in a content of 711-1112 ppm by weight and sodium in a content of 461-721 ppm by weight.

2. The method of recovering nitrile rubber according to claim 1, wherein
  the extruder for use comprises a coagulation zone provided on an upstream side of the washing/dewatering zone,
  a latex of nitrile rubber and coagulation water are supplied to the coagulation zone to coagulate the latex of nitrile rubber thereby to obtain the water-containing crumbs comprising the crumb-like nitrile rubber, and washing and dewatering are then performed in the washing/dewatering zone.

3. The method of recovering nitrile rubber according to claim 2, wherein a supply rate of the latex of nitrile rubber to the extruder is from 50 to 2000 kg/hr.

4. The method of recovering nitrile rubber according to claim 1, wherein
  the extruder for use comprises a drying zone provided on a downstream side of the washing/dewatering zone, and
  the crumb-like nitrile rubber after performing washing and dewatering in the washing/dewatering zone is dried in the drying zone.

5. The method of recovering nitrile rubber according to claim 1, wherein a supply rate of the washing water to the washing/dewatering zone is from 10 to 400 L/hr.

6. The method of recovering nitrile rubber according to claim 1, wherein a supply amount of the washing water to the washing/dewatering zone is from 25 to 1000 parts by weight with respect to 100 parts by weight of the nitrile rubber.

7. The method of recovering nitrile rubber according to claim 1, wherein a temperature of the washing water is from 20° C. to 95° C.

8. The method of recovering nitrile rubber according to claim 5, wherein the supply rate of the washing water to the washing/dewatering zone is from 20 to 320 L/hr.

9. The method of recovering nitrile rubber according to claim 5, wherein the supply rate of the washing water to the washing/dewatering zone is from 60 to 320 L/hr.

10. The method of recovering nitrile rubber according to claim 6, wherein the supply amount of the washing water is from 50 to 800 parts by weight with respect to 100 parts by weight of the nitrile rubber.

11. The method of recovering nitrile rubber according to claim 7, wherein a temperature of the washing water is from 30° C. to 90° C.

12. The method of recovering nitrile rubber according to claim 7, wherein a temperature of the washing water is from 45° C. to 75° C.

13. The method of recovering nitrile rubber according to claim 1, wherein the water pressure is 0.22 MPa or higher.

14. The method of recovering nitrile rubber according to claim 1, wherein the water pressure is 0.25 MPa or higher.

15. The method of recovering nitrile rubber according to claim 1, wherein the water pressure is 0.3 MPa or higher.

* * * * *